April 2, 1968          R. SODER          3,376,082

SELF-LUBRICATING FRICTION DEVICE BETWEEN TWO SURFACES

Filed Aug. 17, 1965

3,376,082
SELF-LUBRICATING FRICTION DEVICE
BETWEEN TWO SURFACES
Robert Soder, Montreux-Territet, Switzerland, assignor to Ebauches S.A. Neuchatel, Switzerland, a firm of Switzerland
Filed Aug. 17, 1965, Ser. No. 480,391
Claims priority, application Switzerland, Aug. 17, 1964, 10,734/64
16 Claims. (Cl. 308—3)

ABSTRACT OF THE DISCLOSURE

A self-lubricating friction device between two surfaces such as a bearing and a shaft in which at least one of the surfaces has a layer constituted of a mixture of a self-lubricating material and a ductile metal, the mixture itself being agglomerated by a binder which also contains a self-lubricating material.

---

Figure 1:
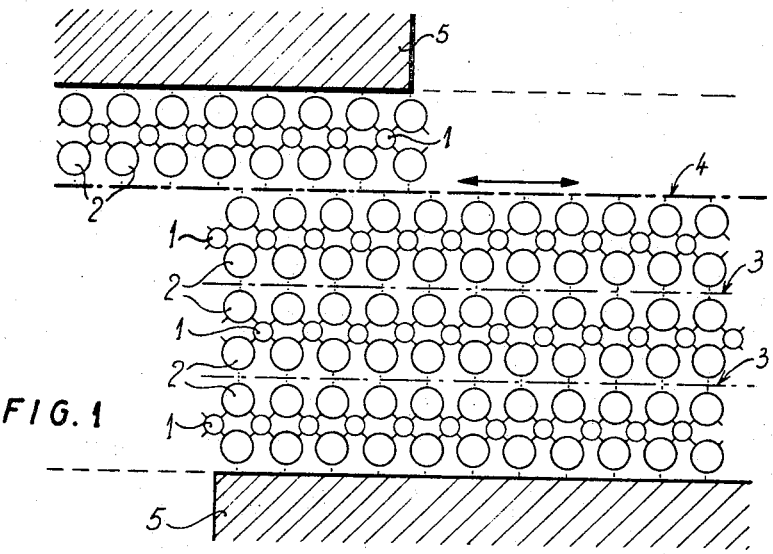

This invention relates to and has for its object to provide a self-lubricating friction device between two surfaces, more particularly between a bearing and its shaft, applicable to engineering, light engineering and watchmaking and clockmaking in particular.

Self-lubricating devices or systems are known. The dry self-lubricating material must possess a high degree of stability in the face of mechanical wear, chemical corrosion and change due to moisture and should not undergo any change under the influence of temperatures ranging between about −20° C. and +120° C.

The present invention is concerned with providing a self-lubricating friction device complying with these conditions and which is, practically speaking, insensitive to wear and to climatic and atmospheric conditions.

Accordingly the invention provides a self-lubricating friction device which is characterized by the fact that at least one of two surfaces in contact is faced with a mixture of a self-lubricating material of lamellar structure and a ductile metal, the said mixture being itself agglomerated by a binder which also contains a self-lubricating material of lamellar structure.

It has been found that certain metallic sulphides, selenides, tellurides and halides of lamellar structure comprising successive layers of thin plane lattices fulfil the required conditions hereinbefore mentioned.

The metals particularly adapted to form sulphides, selenides, tellurides or halides are in particular titanium, chromium, cobalt, copper, zinc, zirconium, niobium, molybdenum, silver, cadmium, indium, tin, antimony, tungsten and uranium. This list, however, is given by way of example only is not restrictive. Moreover it is also possible to use graphite or nitrides, for instance boron nitride, as the self-lubricating material.

Figure 2:
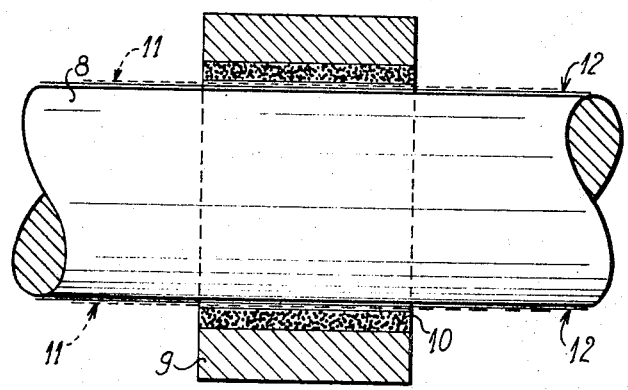
Figure 3:
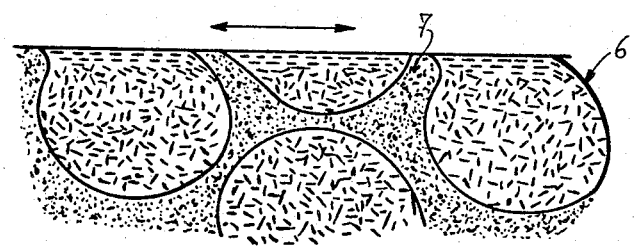

The accompanying drawings illustrate, by way of example, a particular embodiment of the invention in which the material of lamellar structure employed is molybdenum disulphide. In the drawings:

FIGURE 1 is a diagrammatic section of two composite layers of anti-friction material in contact with one another, FIGURE 2 is a diagrammatic section of a bearing with a shaft extending therethrough, and FIGURE 3 is a section of a detail of the agglomerated and bonded anti-friction material on a greatly enlarged scale, showing the structure under the effect of the friction.

The structure of molybdenum disulphide is formed by successive layers of molybdenum atoms 1 and sulphur atoms 2 (FIGURE 1). The crystals of molybdenum disulphide are hexagonal and can easily be split along the planes of division 3 extending through the lattice of sulphur atoms attached to one another beforehand by means of secondary bonds. These division, or cleavage, planes are surfaces of low energy, and therefore with a low coefficient of friction.

The friction surface, which is designated by the reference 4 in FIGURE 1, is located in one cleavage plane or another 3. It therefore follows that a friction surface with a very low coefficient of friction must bear on these crystallites of molybdenum disulphide oriented exactly in the plane of the said surface.

In order to obtain a self-lubricating bearing or bush, the material of lamellar structure such as the metallic sulphide, selenide, telluride or halide, namely, in the example illustrated, the molybdenum disulphide, must be agglomerated with a suitable metal.

It has been ascertained that there should be used for this agglomeration a ductile metal possessing a certain affinity towards the lamellar material employed, in order to ensure good adhesion, and having good resistance to the chemical corrosion of the environment. In the substance formed in this way the crystalline lamellae are necessarily disposed in geometrical order, so that only the crystallites oriented in the plane of the friction surface perform their function as a lubricant.

It has been found that tin, cadmium, indium, lead, copper, silver, zinc and gold can be employed as the ductile agglomerating and covering metal for the lamellar material. By forming alloys with other metals, it is possible to condition the mechanical properties of these metals and influence their resistance to corrosion.

In the example illustrated, the agglomerating metal is cadmium. The cadmium/molybdenum disulphide agglomerate has the appearance of spheres 6 (FIGURE 3) in which the crystallites of molybdenum disulphide are oriented in all directions. Under the effect of the friction due to contact with the other friction surface, however, the surface of this agglomerate undergoes a slight deformation. Running-in causes mechanical sliding of the surfaces which produce microfusion of the rough parts of the covering or coating metal. This deformation in the sliding surface orients all the crystallites of molybdenum disulphide which are disposed in the zone of contact exactly in the sliding plane. The sliding surface is established between the cleavage planes of the molybdenum disulphide; the coating metal serves only as a carrier When the phenomenon of wear begins to occur, fresh planes of molybednum disulphide crystals are exposed and a certain reserve of anti-friction material is thus ensured. The crystalline edges of the molybdenum disulphide form a high-energy zone occupied by foreign elements which seriously impair the sliding properties. However, by using very pure molybdenum disulphide having rather large crystallites, a sliding surface offering a minimum of defects in the continuity of the lattices of sulphur atoms is obtained.

The cadmium used, and also the other agglomerating metals hereinbefore mentioned, possess a low mechanical strength; by adding another material, it is possible to produce a mechanical carrier or support capable of withstanding greater pressures. The agglomerate, cadium/molybdenum disulphide in the example described, is divided, as has been indicated, into small granules or spheres 6 (FIGURE 3) and then bonded with a suitable material, for example a plastic material or an inorganic binder possessing a high degree of adhesion in relation to the agglomerating metal.

The sliding surface is thus intersected by this carrier of binding material and this, in the event of the said carrier having a high coefficient of friction, would lower the coefficient of the complex. In order to remedy this drawback, the binding material is itself mixed, in a homogeneous mixture, with a substance having a lamellar structure, such as molybdenum disulphide. Plastic materials based on polyurethanes and epoxy resins are particularly adapted to perform this function without losing their adhesive strength in relation to the primary agglomerate, in the present case cadmium/molybdenum disulphide.

The agglomerate consisting of plastic material and material having a lamellar structure is shown at 7 in FIGURE 3.

In the hardened state, the plastic material used must show only a slight plastic deformation under the influence of the friction. In order, nevertheless, to enable a good orientation of the crystallites of molybdenum disulphide disposed in the zone of contact to be produced, it is advisable to use a quality much finer than that used in the first agglomerate consisting of ductile metal and substance having a lamellar structure. The crystalline faults in the sliding surface will obviously be more numerous. The percentage of plastic material plus molybdenum disulphide in this complex must be adjusted so as to obtain a topography of the sliding surface such that it guarantees a maximum of surface elements of molybdenum disulphide having large crystallites originating from the agglomerate containing cadmium.

In friction devices according to the invention, such as the device shown in FIGURE 2, comprising a shaft 8 and a bearing 9, one of the two friction elements, for example the bearing, will be lined or faced with a layer 10 of the material hereinbefore described, while the other element, for example the shaft, will be faced only with a very thin layer 11 of material of lamellar structure, in the present case molybdenum disulphide.

In fact, if this facing of the second friction element were to be absent, tearing away of molybdenum disulphide crystals from the surface of the other element would occur immediately on commencement of running-in and these crystals would then be fixed to the surface of the untreated element. If the latter is of polished steel, since the adhesion between polished steel and molybdenum disulphide is poor, considerable wear would appear very rapidly, accompanied by corrosion phenomena. The iron oxide, $Fe_2O_3$, which would then be formed would act as an abrasive, rapidly destroying the surface of the bearing, and the wear would increase with accelerated rapidity. It is therefore necessary to pay particular attention to the preparation of the second friction element, in particular the shaft, when the latter is made of steel, in order to prevent the molybdenum disulphide being torn away from the surface of the first element, for example the bearing, and avid corrosion of the iron.

In order to obtain perfect adhesion between the steel and the molybdenum disulphide, a suitable intermediate layer should be interposed. This layer, designated by the reference 12 in FIGURE 2, must on the one hand exhibit perfect adhesion in relation to the steel and, on the other hand, fix the molybdenum disulphide very firmly. It must at the same time form a protective layer effective against corrosion of the iron.

For perfect fixing of the molybdenum disulphide, certain metals possessing a chemical affinity in relation to sulphur give excellent results. This is the case, for example, with titanium, aluminium, chromium, nickel, cobalt, copper, zinc, zirconium, niobium, molybdenum, silver, gold, cadmium, indium, tin, antimony, tungsten and uranium. These metals can be applied to the steel by an electroplating process or by evaporation under vacuum. It is also possible to use an alloy of at least one of the above-mentioned metals with another metal. The surface element prepared in this way receives, in conclusion, a coating of molybdenum disulphide in an even layer obtained by friction with molybdenum disulphide in powder form or else by evaporation under vacuum. The orientation of the crystallites of molybdenum disulphide is thus obtained by the surface state of the base metal.

The surface of these metals may also be transformed directly into sulphides, selenides or tellurides by a transformation similar to the process known by the name "sulfinuze," or into halides. These sulphides, selenides, tellurides or halides are chemically bound by primary bonds to the layer of metal covering the steel and, as these metals are mechanically very strong, a particularly stable complex is obtained.

It is therefore possible to choose a metal to which the sulphur, selenium, tellurium or halogen is fixed, but different from that of the other sliding surface, with the same function of self-lubricating material of lamellar structure.

In these heterogeneous combinations there are complexes which possess very low coefficients of friction associated with excellent stability.

A sliding plane between two different elements of the sulphur group (sulphur, selenium and tellurium), for example $MeS_2$—$MeSe_2$, $MeS_2$—$MeTe_2$, etc., has a poor coefficient of friction which is explained by the chemical affinity between these elements.

What I claim is:

1. In a self-lubricating friction device between two surfaces: at least one of the surfaces having a layer constituted of a mixture of a self-lubricating material of lamellar structure and a ductile metal, said mixture being itself agglomerated by a binder which also contains a self-lubricating material of lamellar structure.

2. In a self-lubricating device as claimed in claim 1, wherein the mixture of self-lubricating material of lamellar structure and ductile metal is in the form of granules in which the crystallites of material of lamellar structure are oriented in disordered fashion except at the friction surface where, upon mechanical action the said crystallites are oriented in the sliding plane.

3. In a self-lubricating device as claimed in claim 1 wherein the self-lubricating material of lamellar structure is constituted by a metallic sulphide, selenide, telluride or halide in which the metal is titanium, chromium, cobalt, copper, zinc, zirconium, niobium, molybdenum, silver, cadmium, indium, tin, antimony, tungsten or uranium.

4. In a self-lubricating device as claimed in claim 1 wherein the self-lubricating material of lamellar structure is graphite.

5. In a self-lubricating device as claimed in claim 1 wherein the self-lubricating material of lamellar structure is a nitride.

6. In a self-lubricating device as claimed in claim 1 wherein the ductile metal mixed with the self-lubricating material of lamellar structure is tin, cadmium, indium, lead, copper, silver, zinc or gold.

7. In a self-lubricating device as claimed in claim 6, wherein said ductile metal is constituted by an alloy of at least one of the said metals with another metal.

8. In a self-lubricating device as claimed in claim 1 wherein the binder is a plastic material.

9. In a self-lubricating device as claimed in claim 1 wherein the binder is a plastic material based on polyurethane.

10. In a self-lubricating device as claimed in claim 1 wherein the binder is a plastic material based on an epoxy resin.

11. In a self-lubricating device as claimed in claim 1 wherein the binder is an inorganic binder.

12. In a self-lubricating device as claimed in claim 1 wherein the other of the surfaces includes thereon a thin layer of self-lubricating material of lamellar srtucture.

13. In a self-lubricating device as claimed in claim 12, comprising an intermediate layer interposed between said other of said surfaces and the thin layer of self-lubricating lamellar material thereon.

14. In a self-lubricating device as claimed in claim 13, wherein the intermediate metallic layer is titanium, aluminium, chromium, nickel, cobalt, copper, zinc, zirconium, niobium, silver, gold, molybdenum, cadmium, indium, tin, antimony, tungsten, or uranium.

15. In a self-lubricating device as claimed in claim 14, wherein the metallic intermediate layer is an alloy of at least one of the said metals with another metal.

16. In a self-lubricating device as claimed in claim 1, wherein the other of said surfaces is transformed into sulphides, selenides, tellurides, or halides, thus constituting a thin layer of self-lubricating lamellar material.

References Cited
UNITED STATES PATENTS 3,075,279   1/1963   Haltner et al.

OTHER REFERENCES

Bonded Coatings Lubricate Metal Parts, by Alfred Disapo, published in Product Engineering, Sept. 5, 1960.

MARTIN P. SCHWADRON, *Primary Examiner.*

FRANK SUSKO, *Examiner.*